United States Patent Office 3,432,577
Patented Mar. 11, 1969

3,432,577
GRAFT POLYMERIZATION
George E. Serniuk, Roselle, N.J., assignor to Esso Research and Engineering Company, a corporation of Delaware
No Drawing. Filed July 31, 1964, Ser. No. 386,780
U.S. Cl. 260—879        10 Claims
Int. Cl. C08f 15/40

ABSTRACT OF THE DISCLOSURE

A method for forming a graft copolymer by reacting a polar vinyl monomer with a complexing agent and then reacting this product with a preformed polymer in the presence of a free radical generator. The physical properties of the preformed polymer, such as oil solubility, or ability to be crosslinked, are selectively modified by means of this process.

This application relates to a method of grafting polar vinyl monomers onto the backbone of a polymer.

The desirability of grafting a monomer onto a pre-existing polymer is now well established in the art. By means of this graft copolymerization process, the physical characteristics of the polymer onto which the monomer is grafted may be tailored to suit any desired purpose or specification. Thus, for example, the oil solubility of the polymer, its water solubility, or its ability to crosslink may all be changed by means of this graft copolymerization technique. The specific characteristic which is changed depends, in part, on the monomer used and also upon the nature of the polymer which is changed. The production of graft copolymers is well known; however, prior methods of producing such graft copolymers generally relied upon the production of hydroperoxides on the polymer backbone to render it reactive toward vinyl monomers. The instant invention avoids the necessity of the production of such hydroperoxides as is taught, for example, in U.S. Patent No. 2,837,496 issued to Vandenberg on June 3, 1958.

By the present invention graft copolymerization is accomplished by reacting a polar vinyl monomer with a complexing agent in the presence of a suitable solvent, or an excess of the monomer, and then adding the resulting complexed reaction product to a solution of a polymer in the presence of a free radical generator. The complexing agent which is used in this invention must have a coordination number of at least 2. The mole ratio of complexing agent to polar vinyl monomer is in the range of 0.001 to 1.0, preferably 0.05 to 0.5. The mole ratio of free radical generator to vinyl monomer is in the range of 0.0001 to .05, preferably 0.0005 to 0.02. When the process is run in accordance with the teachings herein, it is found that a high percentage of the vinyl monomer is grafted onto the backbone of the polymer with substantially no concomitant homopolymerization of the polar vinyl monomer.

A wide variety of vinyl monomers is useful in this invention, the only restriction being that the vinyl monomer to be complexed be polar in nature. Thus, for example, suitable polar vinyl monomers include, without being limited thereto, acrylonitrile, acrylic acid, acrylamides, methacrylamides and substituted derivatives thereof; acrylic and methacrylic acid esters; fumaric and maleic acids and their esters; crotonic aldehyde; vinyl esters and ketones, such as vinyl acetate, methyl vinyl ketone; vinyl ethers such as vinyl butyl ethers; vinyl sulfones such as vinyl butyl sulfone; acrolein; vinyl phosphonates; vinyl triethoxysilane; 1-acetoxy-z-chlorobutadiene-1,3; 1-acyloxy-1,3-butadiene, and allyl esters such as allyl acetate. Additionally, mixtures of two or more of the above types of polar vinyl monomers can be used as well as mixtures of vinyl monomers in which at least one of the monomers is polar in nature. The preferred polar vinyl monomers are acrylonitrile and acrylic acid. Especially preferred is acrylonitrile.

It is desirable to have a diluent or solvent present during this process and any organic solvent is suitable so long as the solvent is inert to the complex, i.e., the solvent must not preferentially react with the complex so as to form by-products, or displace the polar vinyl monomer from the complex. Suitable solvents include hexane, heptane, and benzene. Preferred is n-hexane. Solvents such as, for example, chloroform, carbon tetrachloride, bromotrichloromethane, ethylene dichloride, and chlorobenzene may be used in combination with hydrocarbon solvents in varying amounts to modify the reaction by their ability to act as chain transfer agents. The solvent may be present to the extent of 4 to 20 volumes per volume of reactants, preferably about 5 to 15 volumes per volume of reactants.

The polymers to which this process may be applied includes saturated and unsaturated homopolymers, saturated and unsaturated copolymers, and saturated and unsaturated terpolymers. These may be amorphous or crystalline in nature. Thus, the homopolymers include poly alpha olefins, such as polyethylene, polypropylene, polybutene, poly(4-methyl-1-pentene), alone or with other saturated and unsaturated homopolymers, such as polyisoprene, polybutadiene, polyvinylchloride, polystyrene, polyvinylisobutylether, and poly alpha methylstyrene. Copolymers to which this invention is applicable, include butyl rubber (a copolymer of a major portion of a $C_4$-$C_7$ isoolefin with a minor portion of a $C_4$-$C_{10}$ multiolefin), nitrile rubber (a copolymer of acrylonitrile and butadiene), styrene-butadiene, and the low pressure copolymers of ethylene with other alpha olefins, such as ethylene-propylene, ethylene-1-butene, and ethylene-1-pentene. The terpolymers to which the invention is applicable include butadiene-styrene-vinyl chloride, for example, along with ethylene-propylene copolymers which include a minor amount of a multiolefin to improve its vulcanization properties. Approximately 1 to 20 mole percent of the third component may be added to the ethylene-propylene polymer, preferably about 2 to 10 mole percent. This third component may be methylene norbornene, butadiene, dicyclopentadiene, or any of a large number of other multiolefinic materials.

The preferred polymers for use with this invention are polyisobutylene, butyl rubber (isobutylene-isoprene copolymer), ethylene-propylene copolymer and a terpolymer which comprises ethylene, propylene, and methylene norbornene. Especially preferred is butyl rubber.

It is contemplated that a wide variety of complexing agents may be utilized in the present invention so long as they have a coordination number of at least 2. Thus, for example, the halides and especially the chlorides of such metals as zinc, cadmium, mercury, aluminum, indium, titanium, tin, vanadium, platinum, molybdenum, rhenium, and manganese are useful. Also useful are metallo-organic compounds such as, for example, aluminum alkyls and aluminum aryls. Examples of these are aluminum triethyl, aluminum tributyl, and aluminum triphenyl. Also useful are boron alkyl compounds, zinc alkyls, phosphorous alkyls and phosphorous aryls. Certain boron halides such as boron trifluoride are also useful in the present invention. The preferred complexing agents are the chlorides of the metals listed above; most preferred is zinc chloride.

The reaction product of the polar vinyl monomer and the complexing agent is contacted with the dissolved polymer in the presence of a free radical generator. A large number of free radical generators is known in the chemical art and it is contemplated that any and all of these will be operative in the present invention. Typical examples are organic peroxides such as benzoyl peroxide, lauroyl peroxide, n-butyl ether peroxide, dicumyl peroxide and ditertiary butyl peroxide. Additionally, hydroperoxides such as tertiary butyl hydroperoxide and naphthene hydroperoxides, are also well-known free radical generators that are useful in the present invention. Further, certain halo-organic compounds are now known to be free radical generators and these are also useful. Examples of such halo-organic compounds include octachlorocyclopentene, hexachloroethane, octachloropropane, bis - heptachlorocyclopentene, and bis(trichloromethyl)sulfone. Also useful are compounds such as 2,2'-azobis(2-methyl propionitrile). Gamma radiation, which is also known to initiate the formation of free radicals, may be used in place of a chemical free radical generator. The preferred free radical generators are benzoyl peroxide and 2,2'-azobis(2-methyl propionitrile).

The invention may be more fully understood by reference to the following examples.

EXAMPLE 1

A butyl rubber (a copolymer of isobutylene and isoprene) with a Mooney viscosity of 70 and an iodine number of 12, was dissolved in hexane to give a cement of 20% concentration. This cement, together with 250 ml. of hexane, was charged to a reactor equipped with a mechanical stirrer, thermometer, reflux condenser, nitrogen seal, and external heater. The air was purged from the system with nitrogen; the polymer solution was stirred; heated to reflux; and acrylonitrile, 67 ml. (1 mole); benzoyl peroxide, 0.1 g.; was added and the reaction was conducted as indicated in the following log of the reaction:

| Time | Temp., °C. | Remarks and observations |
| --- | --- | --- |
| 0820 | 64.5 | Addition of acrylonitrile and peroxide started. |
| 0846 | 56 | Addition of acrylonitrile and peroxide completed. |
| 1025 | 56.5 | Added 0.1 g. of 2,2'-azobis(2-methylpropionitrile). |
| 1035 | 56.5 | Slight, if any, change. |
| 1300 | 56.5 | Slight cloudiness developed. Heat off. |

The product was precipitated by a dropwise addition of 1 liter of acetone to the well-stirred solution. The precipitated polymer was freed of solvents by working it on a warm mill. The final weight of product was 51.5 g. This product was found to contain 0.22% of N, which can be calculated to correspond to 0.83 weight percent of combined acrylonitrile. Thus, less than 1.0 percent of acrylonitrile was grafted onto butyl rubber during 4 hours and 40 minutes of reaction time.

EXAMPLE 2

The reaction described in Example 1 was repeated with the exception that the acrylonitrile was first reacted with 97.4% $ZnCl_2$ in the proportion of 1 mole of acrylonitrile (AN) to 0.1 mole of $ZnCl_2$ before it was combined with benzoyl peroxide, 0.1 g., and added to the refluxing butyl rubber solution. The following is a log of this reaction:

| Time | Temp., °C. | Remarks and observations |
| --- | --- | --- |
| 0920 | 66 | Reflux. Started with addition of AN-$ZnCl_2$ complex. |
| 0930 | 60 | Reaction mixture turned slightly milky. |
| 0932 | 58 | Addition of acrylonitrile-$ZnCl_2$ complex completed. |
| 1027 | 57 | Added 0.1 g. 2,2'-azobis(2-methyl propionitrile). |
| 1036 | 57 | Milky appearance. Viscous. |
| 1140 | 58 | White. Viscous. Some white deposit on walls. |
| 1300 | 59.5 | More viscous. Heat off. |

The product was isolated by the procedure described for the isolation of the product of Example 1. There were recovered 59.7 g. of rubbery product which was found to contain 3.81% of N which corresponds to 14.4% of combined acrylonitrile. This product was found to be soluble in trichloroethylene. After extracting this product with dimethylformamide for 2 hours and 35 minutes on a steam bath, there were recovered 0.9% of a water insoluble residue on evaporating the extract. This indicates that no substantial amount of polyacrylonitrile was formed.

These data show that polar vinyl monomers which are complexed react surprisingly more rapidly with polymers in the presence of free-radical generators than do the monomers which are not complexed. Complexed polar vinyl monomers react with polymers in the presence of free-radical generators without any substantial formation of homopolymer of the vinyl monomer. This process also obviates the necessity of activating the polymer as, for example, by a treatment with air, or air in the presence of a metal catalyst, or by ozone, or hydroperoxides, and so forth, prior to reacting it with a vinyl monomer in a graft reaction.

EXAMPLE 3

The reaction described in Example 2 was repeated except that benzene was used as the solvent, and in place of 2,2'-azobis(2-methylpropionitrile) an equivalent weight of benzoyl peroxide was added. This reaction mixture developed an opaqueness in 25 minutes and became very viscous in 1 hour. At the end of 4 hours, the reaction mixture was extremely viscous and was difficult to stir. Additional solvent was not added as after the 4-hour reaction time the reaction was discontinued and the product was isolated. There were recovered 90 g. of a tough, yellow-colored product which showed a nitrogen content of 8.04% which can be calculated to correspond to an acrylonitrile content of 30.4%.

EXAMPLE 4

Equipment as described in Example 1, but with a reactor with a capacity of 2 liters, was charged with 1000 ml. of a 5% heptane solution of an ethylene-propylene terpolymer containing 3 wt. percent of methylene norbornene and 60 wt. percent ethylene, and the solution was stirred and heated to 78° C. The air in the reactor was supplanted with $N_2$. A complex, prepared by combining 67 ml. (1 mole) of acrylonitrile and 13.6 g. (0.1 mole) of 97.4% $ZnCl_2$, to which was added 0.1 g. of benzoyl peroxide, was added to the polymer solution as indicated by the log of the reaction which follows:

| Time | Temp., °C. | Remarks and observations |
| --- | --- | --- |
| 1345 | 78 | Addition of complex plus peroxide started. |
| 1351 | 73.5 | Addition of complex plus peroxide completed. |
| 1352 | 73 | Reaction mixture looks like a latex. Viscous. |
| 1420 | 74 | Reaction mixture appears grayer in color. |
| 1445 | 75.5 | Added 0.1 g. of benzoyl peroxide. |
| 1500 | 78.5 | Refluxing. Definite latex-like appearance. |
| 1530 | 83 | Not refluxing. Turned to an ivory color. |
| 1555 | 84 | Not refluxing. Thicker. Heat off. |
| 1615 | | 25 ml. of water added and stirred. |

The polymer was precipitated from solution with acetone and was dried by working it on a warm mill. There were recovered 69.35 of a yellowish colored, tough product which showed a nitrogen content of 7.95% which corresponds to an acrylonitrile content of 30.1%.

EXAMPLE 5

The equipment described in Example 1 was charged with 250 g. of a butyl cement (butyl rubber of 70 Mooney and an iodine number of 12) of 20% concentration and 300 ml. of hexane. The solution was stirred and heated to reflux. To the polymer solution was added a complex, prepared by combining 13.6 g. (0.1 mole) of 97.4% $ZnCl_2$ and 68 ml. (1 mole) of acrylic acid, and 0.1 g. of 2,2'- azobis(2 - methylpropionitrile). The reaction was conducted as follows:

| Time | Temp., °C. | Remarks and observations |
|---|---|---|
| 1120 | 62 | Started the addition of the complex plus azo. |
| 1130 | 68 | Addition of complex completed. Brownish color. |
| 1153 | 78 | Precipitate formed on the thermometer well and stirrer. |
| 1200 | 78.5 | Precipitate is brown colored. Reaction mixture is now opaque. |
| 1220 | 78 | Reaction mixture is getting more viscous and opaque. |
| 1255 | 78.5 | Added 0.1 g. of benzoyl peroxide. |
| 1310 | 78 | Reaction mixture is getting progressively more opaque. |
| 1350 | 78 | Reaction mixture now white colored like a latex. |
| 1420 | 78 | Heat off. Added 50 ml. of water and stirred. |

The main reaction product was decanted from the small amount of precipitate which was deposited on the thermometer well and stirrer, and was precipitated by a slow addition of 1 liter of acetone. The product was further washed with water (room temperature) and subsequently with acetone. The dried product was white colored, very tough, and weighed 78 g. This product showed an oxygen content of 14.8% which corresponds to 33.3% of combined acrylic acid.

EXAMPLE 6

Polyisobutylene of 80,000 molecular weight, 50 g., was dissolved in 1000 ml. of n-heptane and was reacted with a complex, which was pepared by combining 13.6 g. (0.1 mole) of 97.4% $ZnCl_2$ with 67 ml. (1 mole) of acrylonitrile, in the presence of benzoyl peroxide, 0.1 g. A log of the reaction follows:

| Time | Temp., °C. | Remarks and observations |
|---|---|---|
| 1345 | 79 | Addition of complex started. |
| 1400 | 73 | Addition of complex completed. |
| 1415 | 73 | Added 0.1 g. benzoyl peroxide. Reaction mixture appears opaque. |
| 1435 | 72.5 | Added 0.1 g. benzoyl peroxide. |
| 1450 | 73 | Reaction mixture appears more opaque. |
| 1515 | 75.5 | Reaction mixture is decidedly more viscous. |
| 1530 | 76 | Reaction mixture has increased in viscosity still further. |
| 1550 | 76.5 | Heating discontinued. Added 50 ml. $H_2O$ and stirred. |

The product was coagulated with acetone and was washed with water followed by acetone. The product was dried overnight in a vacuum oven (45° C. at 200 torr) and finally on a warm mill. Product weighed 53 g. and was light in color and extremely tough. This product showed a nitrogen content of 2.92%, which corresponds to an acrylonitrile content of 11.06%. This product is soluble in trichloroethylene. It will be noted that a relatively large amount of peroxide was used in this experiment to promote this reaction. This was necessary because the inhibitor originally present in the polyisobutylene was not removed prior to this reaction.

This invention has been described in connection with certain specific embodiments thereof; however, it should be understood that these are by way of example rather than by way of limitation, and it is not intended that the invention be restricted thereby.

What is claimed is:
1. A graft polymerization process which comprises:
   (a) Reacting a polar vinyl monomer selected from the group consisting essentially of acrylic acid and acrylonitrile with a complexing agent selected from the group consisting essentially of metal halides, aluminum alkyls, and aluminum aryls, and having a coordination number of at least 2, in the presence of an inert solvent, and
   (b) Reacting the resulting complexed monomer with a polymer selected from the group consisting essentially of polyisobutylene, butyl rubber, ethylene-propylene copolymer, and ethylene-propylene terpolymers containing as a third component a minor amount of a multiolefin in the presence of a free radical generator.
2. The process of claim 1 wherein the mole ratio of complexing agent to vinyl monomer is in the range of 0.001 to 1.0.
3. The process of claim 2 wherein the mole ratio of free radical generator to vinyl monomer is in the range of 0.0001 to 0.05.
4. The process of claim 3 wherein the vinyl monomer is acrylonitrile.
5. The process of claim 4 wherein the complexing agent is zinc chloride.
6. The process of claim 5 wherein the polymer is butyl rubber.
7. The process of claim 6 wherein the free radical generator is benzoyl peroxide.
8. The process of claim 7 wherein the solvent is n-heptane.
9. The process of claim 6 wherein the free radical generator is 2,2'-azobis(2-methylpropionitrile).
10. The process of claim 9, wherein the mole ratio of zinc chloride to acrylonitrile is in the range of 0.05 to 0.5, and the mole ratio of benzoyl peroxide to acrylonitrile is in the range of .0005 to 0.02.

References Cited
UNITED STATES PATENTS

| | | | |
|---|---|---|---|
| 3,183,217 | 5/1965 | Serniuk et al. | 260—85.5 |
| 3,262,993 | 7/1966 | Hagemeyer | 260—879 |

SAMUEL H. BLECH, *Primary Examiner.*

C. J. SECCURO, *Assistant Examiner.*

U.S. Cl. X.R.

260—429.9, 448, 827, 875, 878, 881, 885